United States Patent [19]

Farr

[11] 4,218,882
[45] Aug. 26, 1980

[54] HYDRAULIC POWER SYSTEMS FOR VEHICLE BRAKING AND LEVELLING SYSTEMS

[75] Inventor: Glyn P. R. Farr, Leek Wootton, England

[73] Assignee: Girling Limited, Birmingham, England

[21] Appl. No.: 906,339

[22] Filed: May 16, 1978

[30] Foreign Application Priority Data

May 17, 1977 [GB] United Kingdom ............... 20584/77

[51] Int. Cl.² .......................... F15B 1/02; F15B 11/16
[52] U.S. Cl. ....................................... 60/413; 60/418; 60/422; 60/484
[58] Field of Search ................. 60/413, 418, 420, 422, 60/484; 137/109, 115

[56] References Cited

U.S. PATENT DOCUMENTS

| | | | |
|---|---|---|---|
| 2,799,995 | 7/1957 | Herman | 60/422 X |
| 2,818,711 | 1/1958 | Lincoln et al. | 60/418 X |
| 2,846,850 | 8/1958 | Hall | 60/418 |

*Primary Examiner*—Edgar W. Geoghegan
*Attorney, Agent, or Firm*—Scrivener, Parker, Scrivener and Clarke

[57] ABSTRACT

In an hydraulic power system for operating a vehicle levelling system and braking system, an accumulator supplies both the levelling system and the braking system. The accumulator is connected indirectly to the braking system through a pressure limiting device, which disconnects the braking system from the accumulator when a predetermined pressure is reached.

8 Claims, 1 Drawing Figure

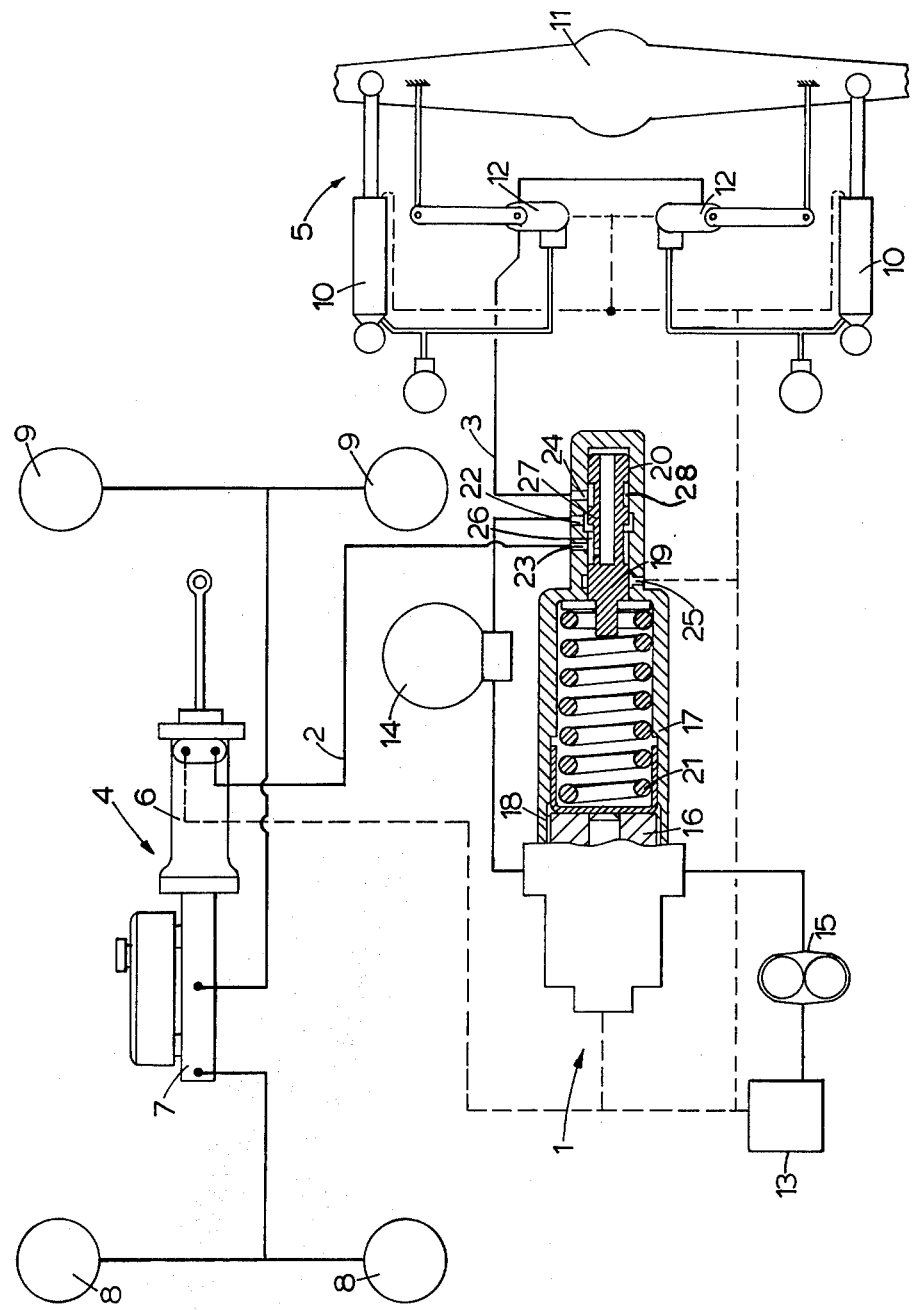

HYDRAULIC POWER SYSTEMS FOR VEHICLE BRAKING AND LEVELLING SYSTEMS

SPECIFIC DESCRIPTION

This invention relates to hydraulic power systems for operating vehicle braking and levelling systems.

Usually such systems comprise a pump which is supplied with hydraulic fluid from a reservoir and which charges an accumulator in turn connected to the braking and levelling systems. However, the pressure required to activate a hydraulic levelling system is generally higher than the maximum brake pressure, so that if the same accumulator is used to supply both systems the braking system itself must be specially adapted. In one known system an input piston of a hydraulic servo of the braking system is of reduced diameter to allow for the high pressure supply, but this causes inconvenience as the pedal gear push rod must act on this piston and if the piston is enlarged at the push rod end, the servo body must also be enlarged to accommodate the extra piston travel.

In other known systems a first accumulator operates the levelling system and a second accumulator with a lower maximum pressure than the first operates the braking system, both accumulators being charged from a pump.

According to our invention an hydraulic power system for operating a vehicle levelling system and braking system includes an accumulator for supplying both the levelling system and the braking system and the accumulator is connected indirectly to the braking system through pressure limiter means adapted to disconnect the braking system from the accumulator when a predetermined pressure is reached.

This is a cheaper and simpler solution as the same accumulator is used to power both systems and no special adaptation of the braking system input is necessary.

Preferably a limiter valve assembly is provided between the accumulator and the braking system and is loaded by resilient means towards an open position in which the accumulator and braking system are connected, the loading of the resilient means determining the pressure at which the valve closes to cut-off the braking system from the accumulator. The resilient means may comprise a spring forming part of an unloader valve assembly for controlling the charging of the accumulator, the spring acting between the limiter valve and the unloader valve. The pre-load of the spring will determine the maximum pressure at which the supply of the braking system is cut-off.

The limiter valve assembly preferably incorporates an inlet valve and an exhaust valve. The exhaust valve is adapted to open to connect the braking system to exhaust if the pressure in the braking system becomes too high due to thermal expansion or leakage past the inlet valve. The inlet and exhaust valves may comprise a single differential piston acting on the spring, or they may alternatively comprise separate ball or poppet valves mounted in a hollow piston acting on the spring.

According to a further feature the accumulator is connected to the levelling system through a priority valve which is adapted to close to cut-off the accumulator supply to the levelling system if the pressure falls below a predetermined value. Preferably the priority valve is incorporated in the limiter valve assembly, and where the assembly comprises a differential piston the priority valve is also incorporated in the piston which selectively connects and cuts-off respective outlet ports in a housing in which the piston works from an inlet port connected to the accumulator.

An embodiment of our invention is illustrated by way of example in the single FIGURE of the accompanying drawing, which is a diagrammatic layout of an hydraulic power supply system.

The power system illustrated in the drawing comprises a power supply assembly 1 for supplying fluid under pressure selectively along lines 2, 3 to a vehicle braking system 4 and a vehicle levelling system 5, respectively. The braking and levelling systems 4, 5 are of a conventional nature. The braking system 4 comprises a power servo 6 to which the pressurised fluid supply is connected and which operates a master cylinder 7 with outputs connected to front and rear wheel brakes 8, 9 respectively. The levelling system 5 includes a pair of levelling struts 10 connected to a vehicle back axle 11 and the pressure fluid supply along line 3 is connected to the struts 10 through power levelling valves 12. Both the braking system 4 and the levelling system 5 have exhaust connections to a reservoir 13 for hydraulic fluid.

The power supply 1 comprises an accumulator 14 charged by a pump 15 supplied with hydraulic fluid from the reservoir 13. The accumulator 14 is charged from the pump 15 through an unloader valve 16 mounted in a housing 17. The housing 17 has a stepped bore with the unloader valve 16 working in a larger diameter portion 18 and a limiting and proportioning valve comprising a stepped piston 19 working in a smaller diameter portion 20 at the opposite end of the housing. An unloader spring 21 acts between the unloader valve 16 and the piston 19.

The output from the accumulator 14 is fed into the bore portion 20 through an inlet port 22. Outlet ports 23 and 24 from the bore portion 20 are connected to the braking system 4 and the levelling system 5, respectively. An exhaust outlet port 25 is connected to the reservoir 13. With the piston 19 in the position shown in the drawing the outlet from the accumulator is connected to the braking system 4 via recess 26 connecting the ports 22 and 23 and cut-off from the levelling system 5 by annular flange 27 which annular flange 27 disconnects the port 24 from the inlet port 22. The unloader spring 21 normally urges the piston 19 into this position.

When the pump 15 is started fluid flows via the unloader valve 16 to charge the accumulator 14. Pressure increases in the accumulator 14 and pressurised fluid supplied to the bore portion 20 through port 22 acts over the area of the piston 19 and eventually overcomes the pre-load in the spring 21, the piston 19 then being urged to the left as shown in the drawing. This movement cuts-off the supply from the inlet port 22 to the outlet port 23 and connects the supply to the outlet port 24 through a second recess 28 and this pressurised fluid is supplied to the levelling system 5. The pressure in the accumulator 14 continues to rise until it reaches the point at which the unloader valve 16 operates and opens to return pressure fluid from the pump 15 to the reservoir 13, allowing the pump to idle. At this point the accumulator is charged to the maximum pressure required by the levelling system, generally about 2000 p.s.i. The accumulator pressure then falls until the unloader valve 16 again cuts in to re-open the pump supply to the accumulator 14. If the accumulator pressure falls below the amount required to overcome the loading in the unloader spring 21 the piston 19 will be urged back to the position shown in the drawing by the spring 21 and the supply to the levelling system 5 will be cut-off. Thus, the piston 19 acts as a priority valve for the levelling system 5 to ensure that the pressure in the levelling system is isolated from the accumulator should the pressure fall below a predetermined minimum value.

When the brakes are applied at any stage in the above operation a servo inlet valve to the brake servo 6 is opened and the fluid pressure acting on the piston 19 through the port 23 connected to the servo 6 falls. This enables the spring 21 to act on the piston 19 and urge it to the right as shown in the drawing until the accumulator output is connected through ports 22 and 23 to the brake servo 6. Pressurised fluid is forced past the piston 19 to the brake servo 6 until the servo inlet valve closes and the piston 19 is again urged to the left to cut-off the outlet port 23 from the inlet port 22. If the line 2 to the brake servo has been overcharged during this operation, due to thermal expansion or leakage past the piston 19, the piston 19 will continue to move to the left until the exhaust port 25 is opened and connected to the line 2 to relieve the pressure. Thus, the piston 19 also acts as a pressure limiting valve for the braking system 4 to ensure that the pressure in the system does not become too high.

I claim:

1. An hydraulic power system for operating a vehicle levelling system and braking system comprising a reservoir for hydraulic fluid, a pump, an unloader valve assembly and an accumulator, said accumulator being charged by said pump from said reservoir through said unloader valve assembly, said accumulator supplying both said levelling system and said braking system, and pressure limiting means through which said accumulator is connected indirectly to said braking system, said pressure limiting means being adapted to disconnect said braking system from said accumulator when a predetermined pressure is reached.

2. An hydraulic power system as claimed in claim 1, wherein said pressure limiter means comprises a limiter valve assembly, and resilient means, said resilient means urging said limiter valve into an open position in which said accumulator and said braking system are connected, the loading of said resilient means determining said pressure at which said limiter valve closes.

3. An hydraulic power system as claimed in claim 2, wherein said limiter valve and said unloader valve are incorporated in a housing and said resilient means comprises a spring, said spring forming part of said unloader valve and acting between said limiter valve and said unloader valve.

4. An hydraulic power system as claimed in claim 2, wherein said limiter valve assembly incorporates an inlet valve and an exhaust valve, said inlet valve being connected to said accumulator, and said exhaust valve being adapted to open to connect said braking system to exhaust when the pressure in said braking system is too high.

5. An hydraulic power system as claimed in claim 4 wherein said inlet and exhaust valves comprise a single differential piston.

6. An hydraulic power system as claimed in claim 1, wherein said accumulator is connected to said levelling system through a priority valve, said priority valve being adapted to close to cut-off said levelling system from said accumulator when the pressure falls below a predetermined value.

7. An hydraulic power system as claimed in claim 6, wherein said priority valve is incorporated in said pressure limiter means.

8. An hydraulic power system as claimed in claim 5, wherein said accumulator is connected to said levelling system through a priority valve, said priority valve being incorporated on said piston of said pressure limiting means, said priority valve being adapted to close to cut-off said levelling system from said accumulator when the pressure falls below a predetermined value.

* * * * *